United States Patent
Modico

(10) Patent No.: US 11,512,487 B2
(45) Date of Patent: Nov. 29, 2022

(54) WAVE GENERATING SYSTEM

(71) Applicant: James Modico, Las Vegas, NV (US)

(72) Inventor: James Modico, Las Vegas, NV (US)

( * ) Notice: Subject to any disclaimer, the term of this patent is extended or adjusted under 35 U.S.C. 154(b) by 0 days.

(21) Appl. No.: 16/801,630

(22) PCT Filed: Nov. 7, 2019

(86) PCT No.: PCT/US2019/060270
§ 371 (c)(1),
(2) Date: Feb. 26, 2020

(87) PCT Pub. No.: WO2020/097332
PCT Pub. Date: May 14, 2020

(65) Prior Publication Data
US 2021/0362024 A1    Nov. 25, 2021

Related U.S. Application Data

(60) Provisional application No. 62/756,700, filed on Nov. 7, 2018.

(51) Int. Cl.
*A47K 3/10* (2006.01)
*E04H 4/00* (2006.01)
(Continued)

(52) U.S. Cl.
CPC ....... *E04H 4/0006* (2013.01); *A63B 71/0619* (2013.01); *A63B 69/0093* (2013.01);
(Continued)

(58) Field of Classification Search
CPC ......... B63B 34/70; A47K 3/10; E04H 4/0006; A63B 69/0093; A63B 69/125
(Continued)

(56) References Cited

U.S. PATENT DOCUMENTS 4,006,499 A * 2/1977 Young .................... A61G 7/002
5/608
6,565,014 B1  5/2003 Hsieh
(Continued)

FOREIGN PATENT DOCUMENTS

JP         05240197 A  *  9/1993
WO    WO 2009058031 A1 *  5/2009

OTHER PUBLICATIONS

Machine Translation of JP 05240197, pp. 5 (Year: 1993).*

*Primary Examiner* — Sunil Singh
(74) *Attorney, Agent, or Firm* — Boudwin Intellectual Property; Daniel Boudwin

(57) ABSTRACT

A wave generating system is provided. The system includes an enclosure having a base and plurality of sidewalls extending orthogonally upward from edges thereof, wherein a plurality of pistons are disposed over the surface area of the base therein. A covering layer of a waterproof and flexible construction is pivotally affixed to a top end of the plurality of pistons and attached to the plurality of sidewalls. The plurality of pistons is operably connected to a circuit board disposed within a control panel via a grid connection and programmed to create patterns and contours in the covering layer via the plurality of pistons. The patterns of ocean floor conditions ideal for surfing, as well as other geometric patterns, may be programmed and operated using a display screen or remote control.

17 Claims, 5 Drawing Sheets

(51) Int. Cl.
*A63B 71/06* (2006.01)
*A63B 69/00* (2006.01)

(52) U.S. Cl.
CPC ... *A63B 2071/0683* (2013.01); *A63B 2208/03* (2013.01); *A63B 2225/50* (2013.01)

(58) Field of Classification Search
USPC .............................................. 405/79; 4/491
See application file for complete search history.

(56) References Cited

U.S. PATENT DOCUMENTS

| | | |
|---|---|---|
| 6,920,651 B2 | 7/2005 | Roberts |
| 8,496,403 B2 | 7/2013 | Lochtefeld et al. |
| 8,573,887 B2 | 11/2013 | Slater et al. |
| 2008/0060123 A1 | 3/2008 | Johnson |

\* cited by examiner

WAVE GENERATING SYSTEM

CROSS REFERENCE TO RELATED APPLICATIONS

This application claims the benefit of International Application No. PCT/US19/60270, filed on Nov. 7, 2019, which claims the benefit of U.S. Provisional Application No. 62/756,700 filed on Nov. 7, 2018. The above identified patent applications are herein incorporated by reference in their entirety to provide continuity of disclosure.

BACKGROUND OF THE INVENTION

The present invention relates to artificial wave generation systems. More specifically, the present invention relates to a unique wave generating system having a control panel allowing users to modify characteristics of artificially generated waves.

Surfing is typically confined to the ocean, for which oceans may teem with sharks or be dangerous due to exceedingly high-amplitude waves and strong currents. People may attempt to surf in a traditional wave pool, but this can be unsafe for themselves and others around them due to surfers not being able to control the size or strength of the waves in these pools. These types of wave pools generally rely on wave generation that occurs on one end of the pool, which then will emanate a wave further down along the length of the pool. This type of generation allows the wave to dissipate the further away from the source you go, and is not as effective as a system that runs the length of the pool. Therefore, a device that can enable a surfer to enjoy surfing in a safe and controllable environment is desired. In this way, the adjustable wave generator system is configured to create typical waves or other types of wave patterns for enabling a user to practice surfing.

Devices have been disclosed in the known art that relate to artificial wave generation systems. These include devices that have been patented and published in patent application publications. These devices generally relate to wave pools having sidewalls and a narrow channel running from a deep end to a tapered beach or shoal. These devices, however, fail to disclose all the elements of the present invention.

In light of the devices disclosed in the known art, it is submitted that the present invention substantially diverges in design elements from the known art, and consequently it is clear that there is a need in the art for an improvement to wave generating systems. In this regard, the instant invention substantially fulfills these needs.

SUMMARY OF THE INVENTION

In view of the foregoing disadvantages inherent in the known types of artificial wave generating systems now present in the known art, the present invention provides a unique wave generating system wherein the same can be utilized for providing a simulated ocean experience for users which includes creating waves and other sea conditions to allow for watersport practice and enjoyment.

It is therefore an object of the present invention to provide a new and improved artificial wave generating system that has all the advantages of devices in the known art and none of the disadvantages.

It is another object of the present invention to provide a unique wave generating system comprising an enclosure having a base and plurality of sidewalls extending orthogonally upward therefrom, defining an interior volume. A plurality of pistons is disposed within the interior volume along the entire base area and topped with a covering layer of waterproof and flexible construction, which is attached to the plurality of sidewalls, creating a sealed enclosure. The plurality of pistons being in electronic communication with a control panel from which a user may selectively operate the plurality of pistons to generate contours within the covering layer to generate waves by simulating optimal ocean surface conditions.

A further object of the present invention is to provide a unique wave generating system wherein the plurality of pistons are secured to one another along a base, are pneumatically operated, and are independently controllable to allow a user to program specific surface patterns within a covering layer as desired.

An additional object of the present invention to provide a unique wave generating system wherein a display screen is in operable communication with the control panel such that a user may selectively operate the plurality of pistons from the display screen as desired.

Yet another object of the present invention is to provide a unique wave generating system wherein the display screen comprises a touchscreen capable medium.

Still a further object of the present invention is to provide a unique wave generating system wherein a remote control in wireless communication with a transceiver within the control panel allows a user to selectively operate the plurality of pistons from points other than that of the display screen.

It is also an additional object of the present invention to provide a unique wave generating system wherein actuators disposed on the remote control selectively operate the plurality of pistons.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
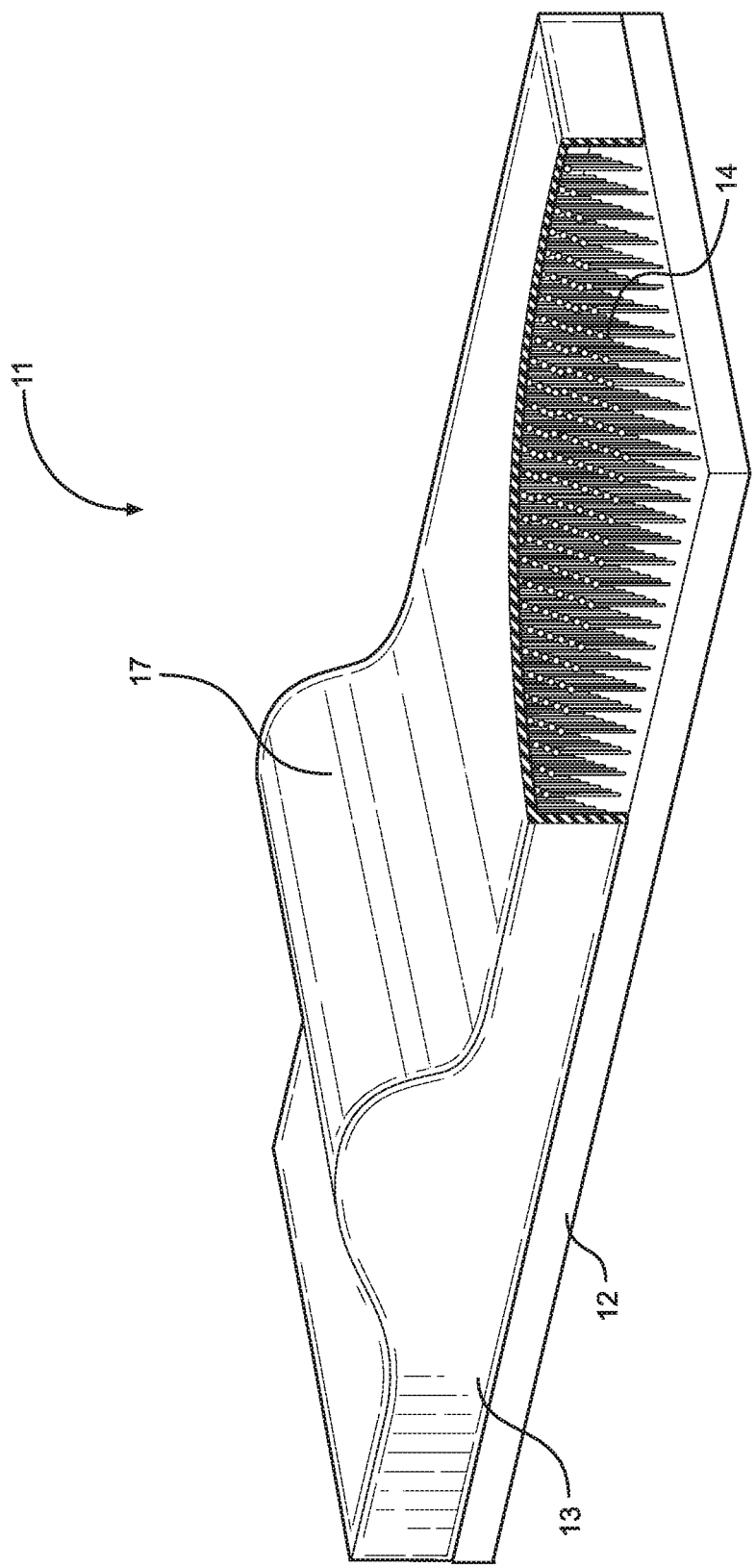
FIG. 1 shows a perspective view of the component parts of an embodiment of the wave generating system.

Reference is made herein to the attached drawings. Like reference numerals are used throughout the drawings to depict like or similar elements of the unique wave generating system. For the purposes of presenting a brief and clear description of the present invention, the preferred embodiment will be discussed as used for providing a simulated ocean and wave experience in a pool setting for surfing and similar activities. The figures are intended for representative purposes only and should not be considered to be limiting in any respect.

Referring now to FIG. 1, there is shown a perspective view of the component parts of an embodiment of the wave generating system. The wave generating system 11 comprises an enclosed structure having a base 12 and a plurality of sidewalls 13 extending orthogonally upward from edges thereon, defining an enclosure having an interior volume. The base 12 of the enclosure includes a plurality of pistons 14 within the enclosure covering the surface area thereof. A covering layer 17 lies across the plurality of pistons 14 and is attached to both a top end of the plurality of pistons 14, as well as a top portion of the sidewalls 13. The covering layer 17 connection with the sidewalls 13 forms a waterproof enclosure configured to be completely submerged under water in either the ocean, or a wave pool, and remain on a bottom surface thereof. In the illustrative embodiment, the base 12 and sidewalls 13 are made of a rigid construction and may be made of a metallic material or any other suitable material. The enclosure may resemble an elongated rectangular shape, as shown in the illustrative embodiment, or may include any suitable shape as desired.

Figure 2:
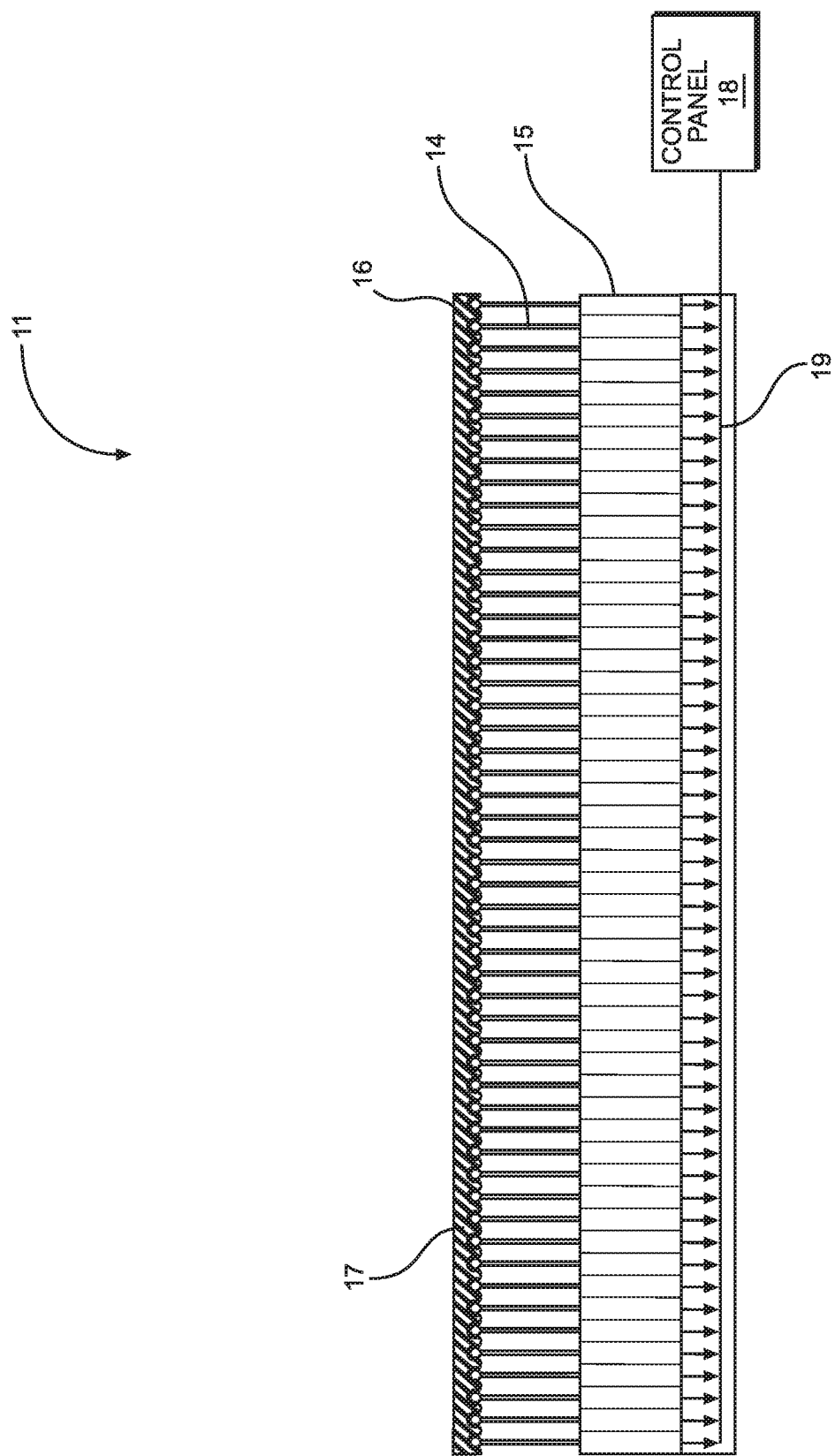
FIG. 2 shows a side cross-sectional view of the component parts of an embodiment of the wave generating system.
Figure 3:
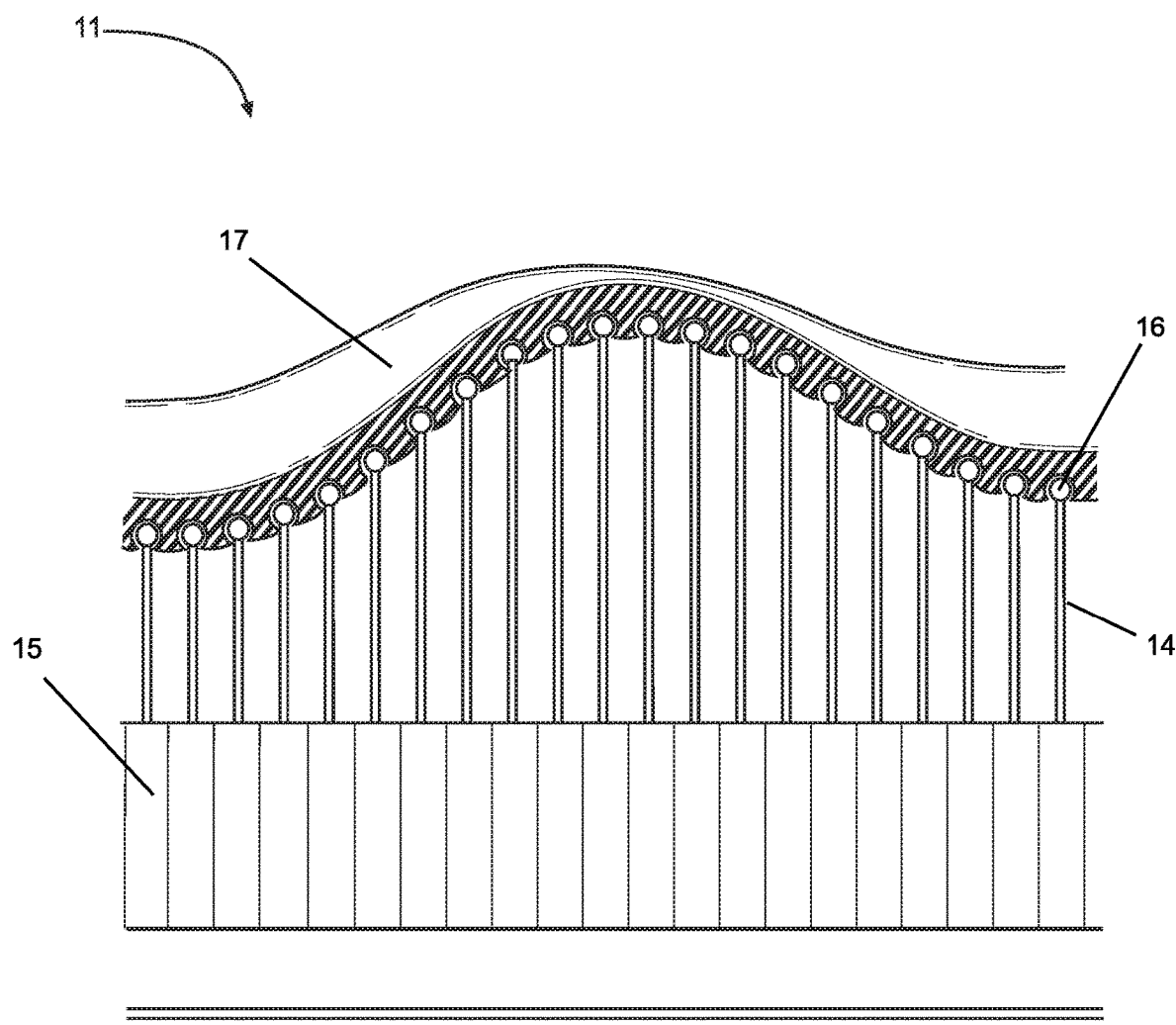
FIG. 3 shows a zoomed-in cross-sectional view of an embodiment of the wave generating system.

Referring now to FIG. 2 and FIG. 3, there is shown a side cross-sectional view of the component parts of an embodiment of the wave generating system, and a zoomed-in cross-sectional view of an embodiment of the wave generating system, respectively. The plurality of pistons 14 include a propulsion system 15 on a bottom end of the plurality of pistons 14, which allow the pistons 14 to be extended and retracted vertically as needed. Each piston of the plurality of pistons 14 includes a propulsion system 15 on the bottom end thereof, which may independently move the piston as needed. A propulsion system 15, such as pneumatic pumps or compression pumps, may be used to propel the individual pistons 14 of the unique wave generating system 11. An appropriate propulsion system determined based on the working depth and required PSI for each unit area and size can be selected accordingly by a user such that the pistons 14 are able to lift the covering layer efficiently.

The covering layer 17 lies across the top surface of the plurality of pistons 14 which keeps the plurality of pistons 14 enclosed and separated from the volume of liquid above. The covering layer 17 is of a waterproof and flexible construction to allow for the layer to contour and accommodate the movement of the plurality of pistons 14 underneath. The covering layer 17 may be made out of an isoprene polymer, or any other material having a suitably elastic quality. In the illustrative embodiment, the covering layer 17 is made out of rubber. In alternate embodiments, an additional coating of water sealant may be included along the connection of the covering layer 17 and the sidewalls 13 to ensure no water leaks within the enclosure.

The plurality of pistons 14 include a rounded tip 16 on an end opposite the propulsion system 15. In one embodiment, the propulsion system comprises hydraulic pumps that are configured to drive each of the plurality of pistons 14. In other embodiments of the wave generating system 11, the propulsion system comprises pneumatic pumps configured to drive the plurality of pistons 14. The rounded tips 16 ensure the plurality of pistons 14 do not puncture the covering layer 17, and additionally provide a smoother and more uniform contour in the covering layer 17 when in use. In the illustrative embodiment, the covering layer 17 includes indentations within the interior surface thereof adapted to receive the rounded tips 16 of the plurality of pistons 14 therein. These indentations act as a ball and socket joint to allow the covering material to contour more freely around the piston, while still maintaining structural integrity.

The plurality of pistons 14 are independently moveable from one another and are each separately connected to a control panel 18 via an operable grid connection 19. A circuit board within the control panel 18 operates the propulsion systems 15 of the plurality of pistons 14, which may then extend and retract. The operation of the plurality of pistons 14 may then be used to generate waves by simulating ideal ocean surface conditions through contouring of the covering layer 17 underneath a body of water. The specific pattern of the ocean floor at specific points are crucial in the formation of waves and their unique characteristics are what make famous surfing beaches special.

Figure 4:
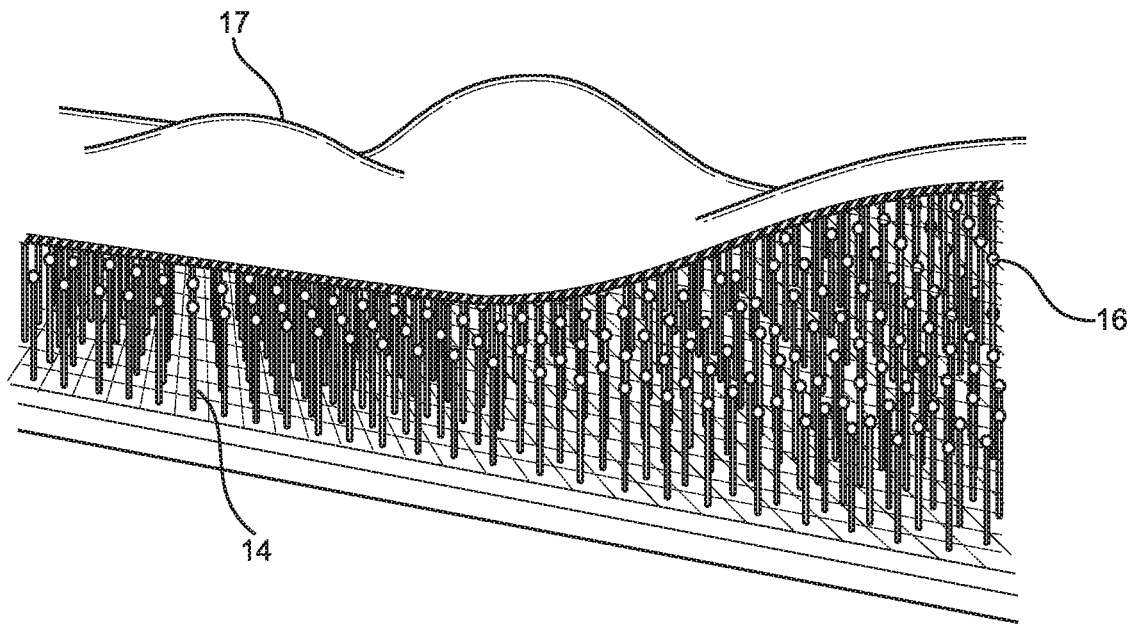
FIG. 4 shows a perspective cross-sectional view of the base of an embodiment of the wave generating system.
Figure 5:
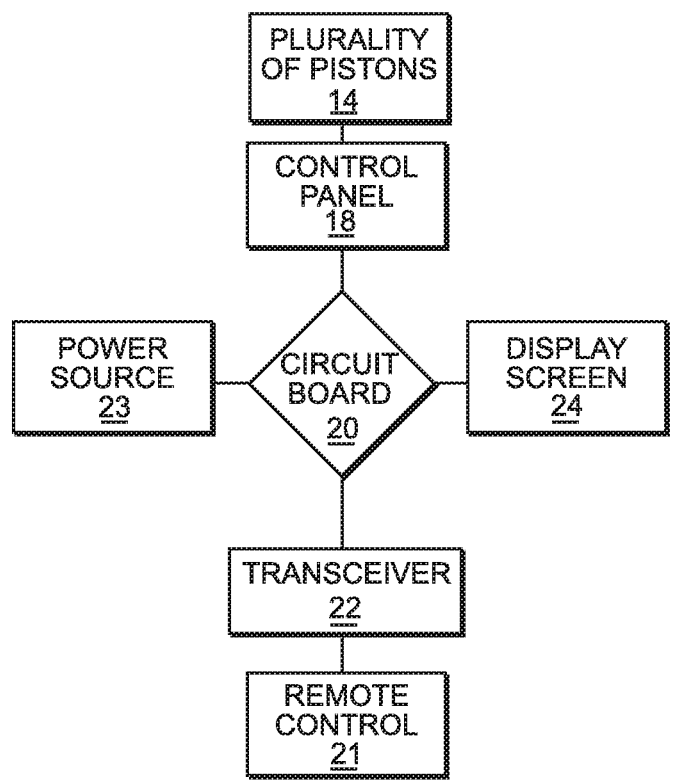
FIG. 5 shows a schematic view of the electronic components of an embodiment of the wave generating system.

Referring now to FIG. 4 and FIG. 5, there is shown a perspective cross-sectional view of the base of an embodiment of the wave generating system, and a schematic view of the electronic components of an embodiment of the wave generating system, respectively. The extension and retraction of the plurality of pistons 14 in corresponding rows along the length of the base 12 similarly raises and depresses the covering layer 17 along the length of the base 12. Famous surfing beach configurations and geometrical patterns may be programmed to be made by the plurality of pistons 14 by uploading patterns and piston commands into the circuit board 20 of the control panel 18. These configurations may be selectively controlled by a user via the control panel 18 of the wave generating system 11. In some embodiments, the control panel 18 may be wirelessly operated by a user with a remote control 21. In such embodiments, a transceiver disposed within the circuit board 20 of the control panel 18 allows for wireless communication between the user operated remote control 21 and the control panel 18 to operate the plurality of pistons 14.

The wave generating system 11 is operably connected to a power source 23 which in turn allows for the plurality of pistons 14 to be operated. This power source 23 can be made up of a direct connection to a power supply grid, as well as self-contained batteries. In one embodiment of the wave generating system 11, the power source 23 is a rechargeable battery, and the wave generating system 11 may further include one or more external solar panels configured to recharge the battery. In some embodiments, a display screen 24 is operably attached to the circuit board 20 and configured to display information about the wave generating system 11, as well as to manually input commands for the control panel 18. The display screen 24 allows for a user to selectively control aspects of the pattern at which the plurality of pistons 14 are programmed to follow. These aspects include the size and shape of the contours being created in the covering layer 17 by the plurality of pistons 14, as well as expanding and retracting at various speeds and lengths.

In some embodiments of the wave generating device 11, a variety of geometric patterns may also be selected between which could create differing water conditions based on a user's preference, such as choppy water or stormy waves. A user may also use the remote control 21, which is in wireless communication with a transceiver 22 in the control panel 18, to selectively operate the wave generating system 11. This would allow a user the freedom of operating the fluid conditions without having to be physically present at the display screen 24, such that the system may be used externally in an artificial body of water or to enhance the natural tidal actions of a given stretch of natural coastline. In some embodiments, the display screen 24 may comprise a touch operated liquid crystal display (LCD), wherein a user may manually operate and choose between settings using the touch of a finger.

Figure 6:
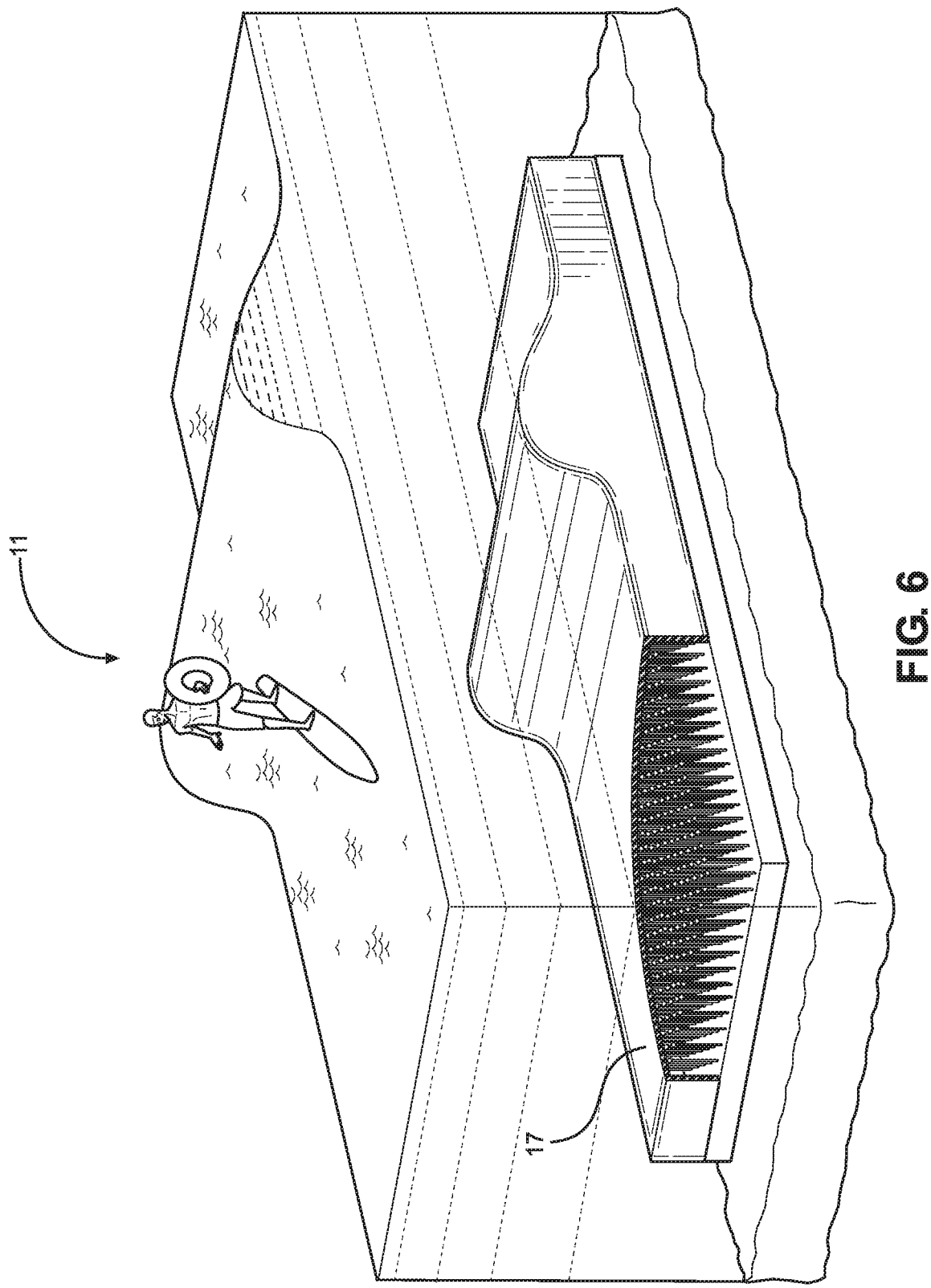
FIG. 6 shows a perspective view of an embodiment of the wave generating system in use within the open ocean.

Referring now to FIG. 6, there is shown a perspective view of an embodiment of the wave generating system in use within the open ocean. In practice, the wave generating system may be placed in either the open water such as an ocean floor, or within a wave generating pool. The wave generating system will enhance the waves generated in a wave pool and give them certain characteristics based on the preferences of a user. These characteristics will be transferred to the wave generated in the wave pool by flowing over the wave generating system 11 and interacting with the covering layer 17. The ridges and contours in the covering layer 17 then impart certain characteristics to the wave, such as height and tube shape. The same principal allows the wave generating system 11 to be placed in the ocean to rest along the surface where it may then enhance the existing waves of a given stretch of coastal shoreline.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wave generating system, comprising:
   an enclosure having a base and plurality of planar sidewalls extending orthogonally upward from a perimeter of the base and defining an interior volume therein;
   a plurality of pistons disposed along the base of the enclosure within the interior volume;
   a control panel in operable communication with the plurality of pistons;
   a covering layer pivotally attached to a top end of the plurality of pistons and affixed to the plurality of sidewalls;
   wherein the covering layer includes an interior surface having a plurality of indentations formed therein, wherein each indentation receives a hemispherical ball member attached to an upper end of an individual piston of the plurality of pistons.

2. The wave generating system of claim 1, wherein the covering layer is attached to a top end of each sidewall of the plurality of sidewalls.

3. The wave generating system of claim 1, wherein each piston of the plurality of pistons is independently controllable with respect to each additional piston of the plurality of pistons.

4. The wave generating system of claim 1, wherein the plurality of pistons is configured to make wavelike patterns and contours in the covering layer via the control panel.

5. The wave generating system of claim 1, wherein the plurality of pistons is configured to create various geometric patterns via the control panel.

6. The wave generating system of claim 1, wherein each piston of the plurality of pistons is pneumatically operated.

7. The wave generating system of claim 1, wherein each piston of the plurality of pistons is of a rigid construction.

8. The wave generating system of claim 1, wherein each piston of the plurality of pistons is configured to alter contouring on an upper surface of the covering layer when each piston of the plurality of pistons moves between an extended position and a retracted position.

9. The wave generating system of claim 1, wherein the covering layer is of a flexible construction.

10. The wave generating system of claim 9, wherein the covering layer is removable.

11. The wave generating system of claim 9, wherein the covering layer is of a waterproof construction.

12. The wave generating system of claim 1, further comprising a display screen in operable communication with the control panel.

13. The wave generating system of claim 12, wherein the display screen comprises an interface having touchscreen functionality.

14. The wave generating system of claim 12, wherein the display screen allows a user to selectively control the plurality of pistons to form a selected geometric pattern on an upper surface of the of the covering layer, wherein the selected geometric pattern is stored on a circuit board of the control panel.

15. The wave generating system of claim 1, further comprising a transceiver within the control panel in electronic communication with a remote control.

16. The wave generating system of claim 15, wherein actuators disposed on the remote control allow a user to selectively control the plurality of pistons.

17. A wave generating system, comprising:
   an enclosure having a base and plurality of planar sidewalls extending orthogonally upward from a perimeter of the base;
   a plurality of pistons disposed along the base of the enclosure;
   a covering layer pivotally attached to a top end of the plurality of pistons and affixed to the plurality of sidewalls, the covering layer comprising an interior surface having a plurality of indentations formed therein, wherein each indentation receives a hemispherical ball member attached to an upper end of an individual piston of the plurality of pistons;
   a control panel in operable communication with a circuit board and with each piston of the plurality of pistons, the circuit board having at least one ocean floor pattern stored thereon;
   the control panel configured to, upon receiving a pattern selection from a user via an input mechanism, adjust each piston of the plurality of pistons to form a contour in the covering layer that corresponds to the stored at least one ocean floor pattern.

* * * * *